(12) United States Patent
Lin

(10) Patent No.: US 8,331,021 B2
(45) Date of Patent: Dec. 11, 2012

(54) OPTICAL SIGHT HAVING A COAXIAL ILLUMINATION FUNCTION

(75) Inventor: Chen-Yeh Lin, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 403 days.

(21) Appl. No.: 12/814,757

(22) Filed: Jun. 14, 2010

(65) Prior Publication Data

US 2011/0304907 A1 Dec. 15, 2011

(51) Int. Cl.
*G02B 23/00* (2006.01)

(52) U.S. Cl. .......................................... 359/399; 42/146

(58) Field of Classification Search .................. 359/399, 359/419; 42/113, 114, 117, 119, 146
See application file for complete search history.

(56) References Cited

U.S. PATENT DOCUMENTS

| 3,813,790 | A | * | 6/1974 | Kaltmann | 42/132 |
| 5,052,801 | A | * | 10/1991 | Downes et al. | 356/153 |
| 5,557,872 | A | * | 9/1996 | Langner | 42/117 |
| 7,997,022 | B2 | * | 8/2011 | Morin et al. | 42/114 |
| 2003/0002034 | A1 | * | 1/2003 | Morcom et al. | 356/152.1 |
| 2008/0297885 | A1 | * | 12/2008 | Pochapsky et al. | 359/353 |

* cited by examiner

*Primary Examiner* — Frank Font
(74) *Attorney, Agent, or Firm* — Trop Pruner & Hu, P.C.

(57) ABSTRACT

An optical sight includes an outer barrel unit, an objective lens unit, an ocular lens unit, a magnification unit, and an illumination unit. The outer barrel unit extends about an axis and has a front end and a rear end. The objective lens unit is mounted to the front end of the outer barrel unit and has a first optical axis. The ocular lens unit is mounted to the rear end of the outer barrel unit. The magnification unit is disposed in and on the outer barrel unit between the objective lens unit and the ocular lens unit, and has a second optical axis. The illumination unit is disposed on the magnification unit, and includes a light source spaced apart from the second optical axis, and a reflective element for projecting emitted light, which is emitted from the light source, onto the objective lens unit.

11 Claims, 4 Drawing Sheets

OPTICAL SIGHT HAVING A COAXIAL ILLUMINATION FUNCTION

BACKGROUND OF THE INVENTION

1. Field of the Invention

The present invention relates to an optical sight, more particularly to an optical sight having a coaxial illumination function.

2. Description of the Related Art

A conventional optical sight used with a firearm requires a flashlight, which is mounted on the optical sight or the firearm, to provide illumination when ambient light is not sufficient. However, with such an arrangement, the optical sight is not coaxial with the flashlight such that the point of illumination and the aiming point are not on-axis. As a result, the response time and accuracy of shooting are negatively affected. Moreover, it is troublesome to use the additionally mounted flashlight, and such a configuration makes the optical sight and the firearm bulky.

SUMMARY OF THE INVENTION

Therefore, the object of the present invention is to provide an optical sight having a coaxial illumination function, in which an illumination point and an aiming point are on-axis.

Accordingly, an optical sight of the present invention comprises an outer barrel unit, an objective lens unit, an ocular lens unit, a magnification unit, and an illumination unit. The outer barrel unit extends about an axis and has a front end and a rear end. The objective lens unit is mounted to the front end of the outer barrel unit and has a first optical axis. The ocular lens unit is mounted to the rear end of the outer barrel unit. The magnification unit is disposed in and on the outer barrel unit between the objective lens unit and the ocular lens unit. The magnification unit has a second optical axis. The illumination unit is disposed on the magnification unit, and includes a light source and a reflective element. The light source is spaced apart from the second optical axis. The reflective element is for projecting emitted light, which is emitted from the light source, onto the objective lens unit. The light source and the reflective element are disposed and configured such that the emitted light is projected onto the objective lens unit substantially along the second optical axis. The emitted light is formed into parallel light after passing through the objective lens unit. The parallel light is substantially parallel with the first optical axis and is projected onto a target.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
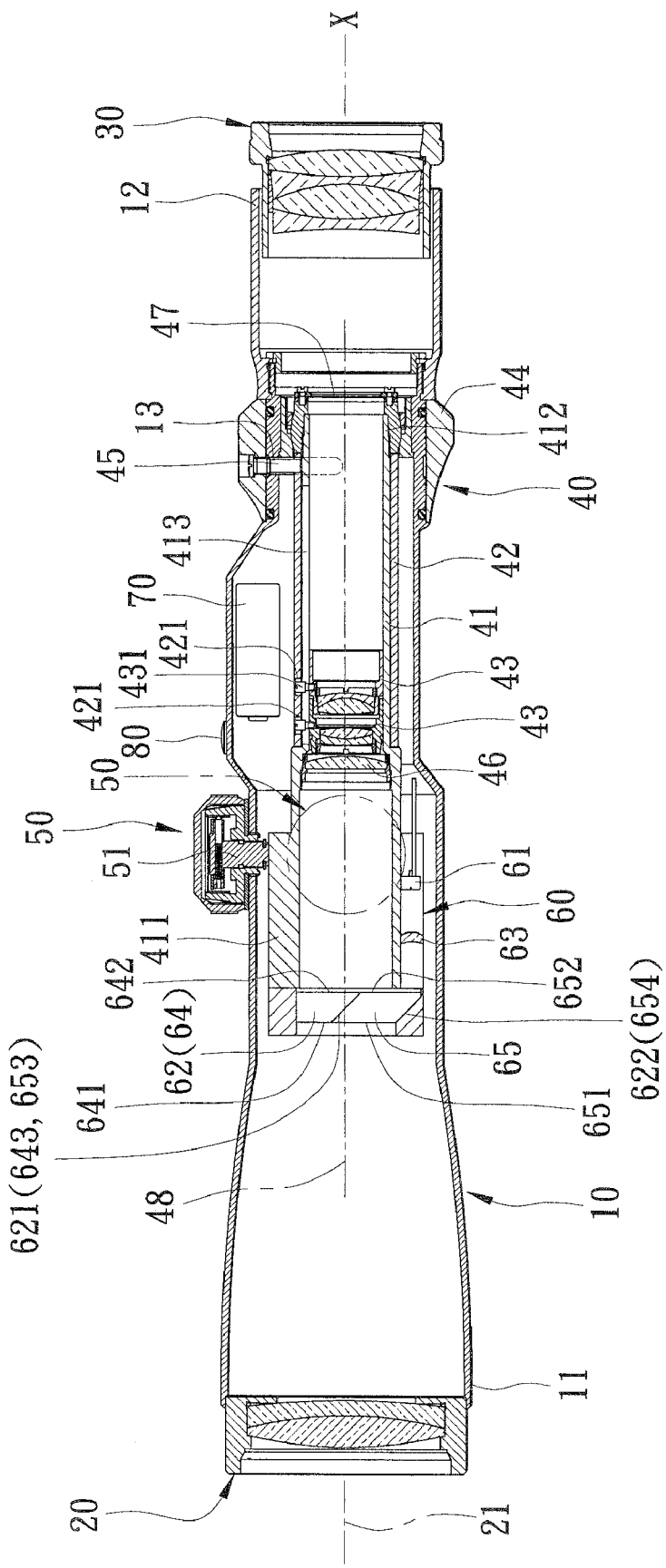
FIG. 1 is a sectional view of an optical sight having a coaxial illumination function according to a preferred embodiment of the present invention.
Figure 2:
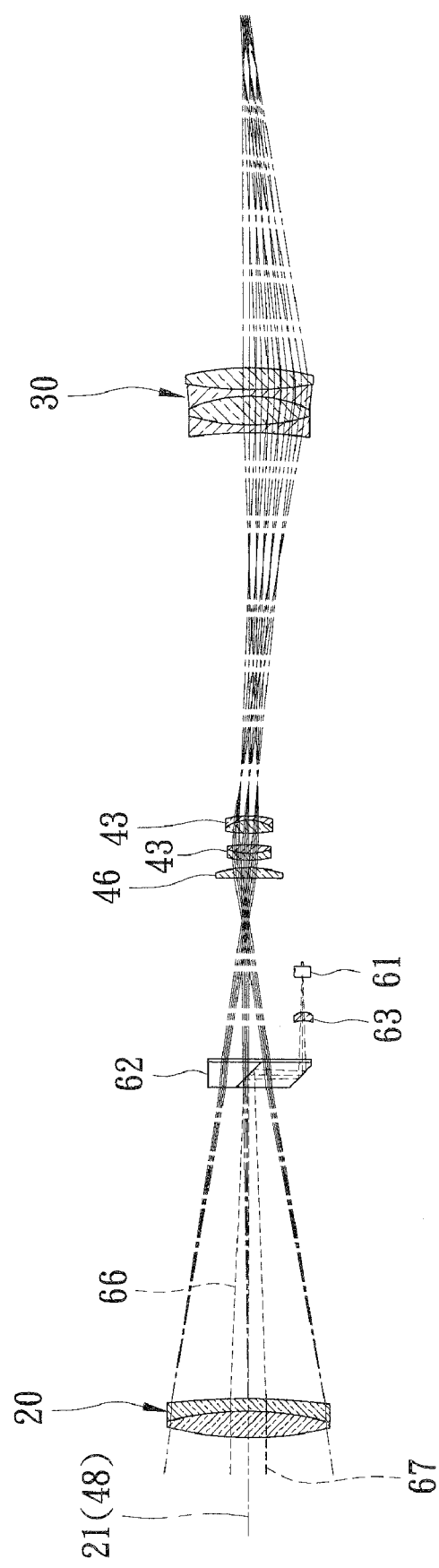
FIG. 2 is a schematic view of an arrangement of optical elements of the optical sight of the preferred embodiment.

Referring to FIGS. 1 and 2, a preferred embodiment of an optical sight according to the present invention is shown to comprise an outer barrel unit 10, an objective lens unit 20, an ocular lens unit 30, a magnification unit 40, two adjustment units 50, an illumination unit 60, a battery 70, and an operating button 80.

The outer barrel unit 10 extends about an axis (X) and has a front end 11, a rear end 12, and a circumferentially extending slot 13 that at least partially surrounds the axis (X).

The objective lens unit 20 is mounted to the front end 11 of the outer barrel unit 10, and has a first optical axis 21.

The ocular lens unit 30 is mounted to the rear end 12 of the outer barrel unit 10.

The magnification unit 40 is disposed in and on the outer barrel unit 10 between the objective lens unit 20 and the ocular lens unit 30. The magnification unit 40 includes a first inner barrel component 41 rotatably disposed in the outer barrel unit 10, a second inner barrel component 42 sleeved on the first inner barrel component 41, a plurality of lens assemblies 43 movably disposed in the first inner barrel component 41 along the axis (X), a magnification adjusting ring 44 sleeved on the outer barrel unit 10, an adjusting pin 45 disposed on the magnification adjusting ring 44, a focusing lens 46 securely disposed in the first inner barrel component 41, and an aiming reticle 47 disposed on a rear end of the first inner barrel component 41. The magnification unit 40 has a second optical axis 48.

The first inner barrel component 41 has a front end portion 411, a rear end portion 412, and a guide slot 413. The second inner barrel component 42 has a plurality of cam slots 421 that respectively correspond to the lens assemblies 43. Each of the lens assemblies 43 has a guide pin 431 that extends through the guide slot 413 and into the respective one of the cam slots 421. The adjusting pin 45 extends through the circumferentially extending slot 13 to connect to the second inner barrel component 42. A change in magnification occurs by means of manipulating the magnification adjusting ring 44.

The adjustment units 50 are respectively disposed on a top side and a right side of the outer barrel unit 10. Each of the adjustment units 50 includes an adjusting component 51 that extends into the outer barrel unit 10 and abuts against an outer peripheral surface of the first inner barrel component 41. The adjusting components 51 can be manipulated respectively for elevation and windage adjustment of the aiming reticle 47. A biasing member (not shown) is disposed opposite to the adjustment units 50 between the outer barrel unit 10 and the first inner barrel component 41.

The illumination unit 60 is disposed on the magnification unit 40, and includes a light source 61, a reflective element 62, and a focusing lens 63. The light source 61 is spaced apart from the second optical axis 48. The reflective element 62 is for projecting emitted light 66, which is emitted from the light source 61, onto the objective lens unit 20. The focusing lens 63 is disposed on the outer peripheral surface of the front end portion 411 of the first inner barrel component 41 between the reflective element 62 and the light source 61.

The light source 61 and the reflective element 62 are disposed and configured such that the emitted light 66 is projected onto the objective lens unit 20 substantially along the second optical axis 48. The emitted light 66 is formed into parallel light 67 after passing through the objective lens unit 20. The parallel light 67 is substantially parallel with the first optical axis 21 and is projected onto a target 100 (see FIG. 4). It is noted that the parallel light 67 is coaxial with the first optical axis 21 before the adjustment units 50 are manipulated for adjustment of the aiming reticle 47. However, after manipulation of the adjustment units 50 for adjustment of the aiming reticle 47, the parallel light 67 is parallel to the first optical axis 21.

The light source 61 is disposed on an outer peripheral surface of the front end portion 411 of the first inner barrel component 41 in a manner so as to be parallel to the second optical axis 48. In this embodiment, the light source 61 includes a light emitting diode (LED).

The reflective element 62 is disposed on a front end of the front end portion 411 of the first inner barrel component 41, and has a first reflection surface 621 intersecting the second optical axis 48 of the magnification unit 40, and a second reflection surface 622 parallel to the first reflection surface 621 and facing the light source 61. In this embodiment, the reflective element 62 includes a first prism 64 and a second prism 65. The first prism 64 has a first plane 641 facing the objective lens unit 20, a second plane 642 facing the ocular lens unit 30, and a first inclined surface 643 interconnecting the first plane 641 and the second plane 642. The second prism 65 has a third plane 651 facing the objective lens unit 20, a fourth plane 652 facing the ocular lens unit 30, a second inclined surface 653 interconnecting the third plane 651 and the fourth plane 652 and joined with the first inclined surface 643, and a third inclined surface 654 interconnecting the third plane 651 and the fourth plane 652 and parallel to the second inclined surface 653. The first reflection surface 621 is a reflection coating formed where the first and second inclined surfaces 643, 653 are joined. The second reflection surface 622 is a reflection coating formed on the third inclined surface 654.

The emitted light 66 from the light source 61 passing through the focusing lens 63 is reflected toward the first reflection surface 621 by the second reflection surface 622 and then is reflected toward the objective lens unit 20 by the first reflection surface 621. The objective lens unit 20 and the reflective element 62 cooperate to define a focal length, which is substantially identical to a length of an optical path of the emitted light 66 from the light source 61 to the objective lens unit 20.

The battery 70 is disposed in the outer barrel unit 10 and is electrically connected to the light source 61.

The operating button 80 is disposed on the outer barrel unit 10. The operating button 80 may be manipulated by a user to control a switching operation of the light source 61.

Figure 3:
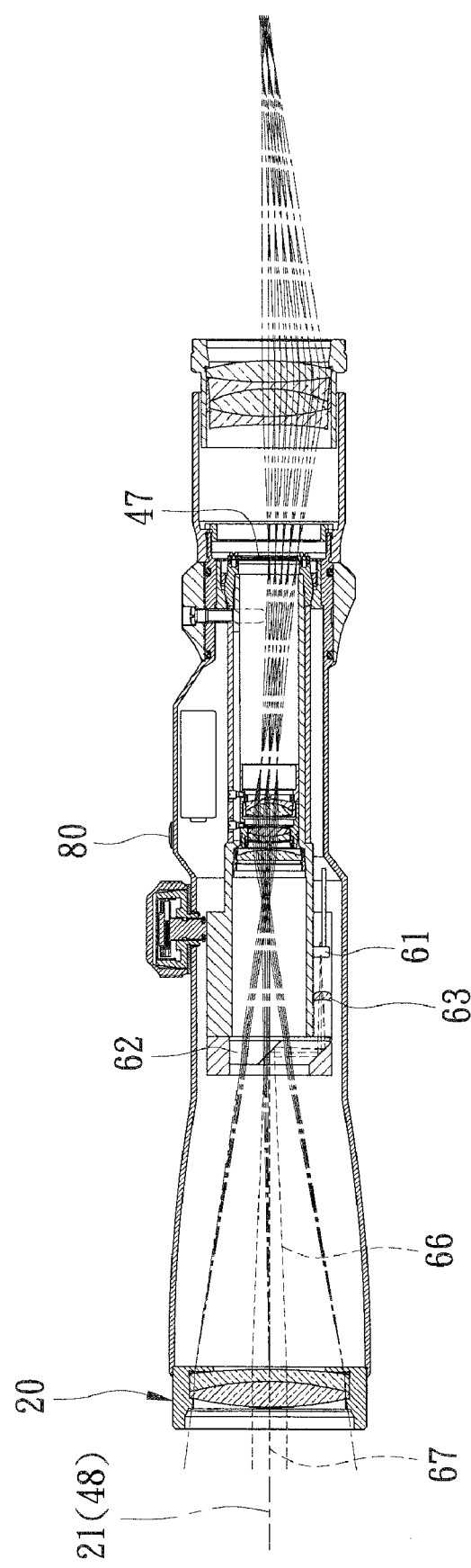
FIG. 3 is a sectional view of the preferred embodiment to illustrate that light emitted from a light source is formed into parallel light after passing through an objective lens unit, and the parallel light is substantially parallel with a first optical axis of the objective lens unit.
Figure 4:
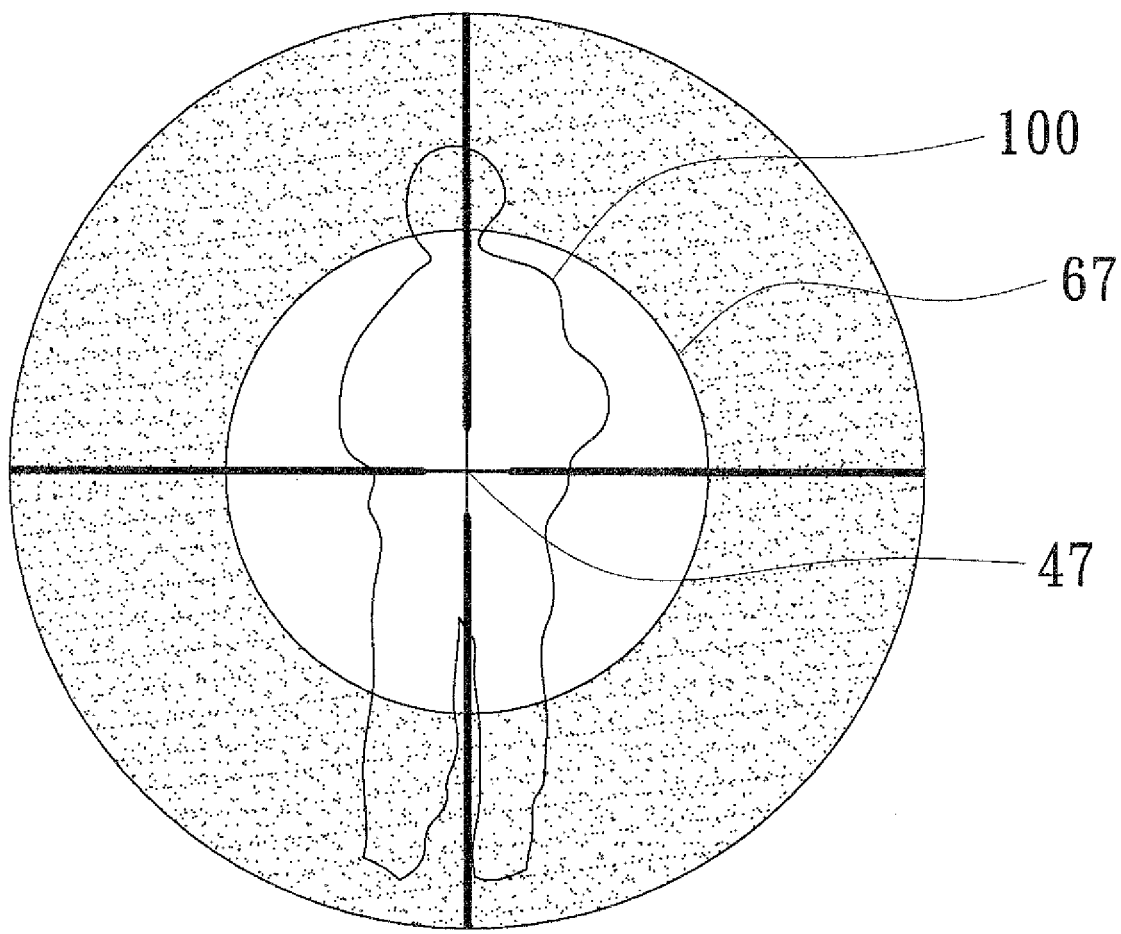
FIG. 4 is a schematic view of the preferred embodiment to illustrate that an illumination point and an aiming point are on-axis and are aiming at a target.

Referring to FIGS. 3 and 4, when the operating button 80 is pressed, the emitted light 66 from the light source 61 passes through the focusing lens 63, and then is directed toward the objective lens unit 20 after being reflected inside and refracted by the reflective element 62. The emitted light 66 is transformed into the parallel light 67 projected onto the target 100 after passing through the objective lens unit 20. An illumination point of the parallel light 67 on the target 100 overlaps, or is coaxial with, an aiming point of the aiming reticle 47 on the target 100. Such overlapping of the illumination point with the aiming point is convenient for aiming and shooting.

The advantages of the present invention can be summarized as follows:

i) The length of the optical path of the emitted light 66 from the light source 61 to the objective lens unit 20 is substantially identical to the focal length of the objective lens unit 20 and the reflective element 62. Therefore, the light source 61 is disposed at a location as if it were positioned at the focal point defined by the objective lens unit 20 and the reflective element 62. As a result, the emitted light 66 from the light source 61 passing through the objective lens unit 20 is transformed into the parallel light 67, which is substantially parallel with the first optical axis 21 and is projected onto the target 100 in this state. Furthermore, the emitted light 66 reflected and refracted by the reflective element 62 is coaxial with the second optical axis 48 of the magnification unit 40. The light source 61 and the magnification unit 40 share the objective lens unit 20 such that the illumination point of light emitted from the light source 61 is coaxial with the aiming point of the aiming reticle 47. Compared to the prior art, use of the present invention allows for improvement in response time and accuracy of shooting.

ii) The present invention integrates the illumination unit 60 into the optical sight. Compared to the prior art, the present invention not only provides convenience during use (for example, mounting of a separate flashlight is unneeded), but also allows for a reduction in volume and weight of firearm on which the optical sight of the present invention is used.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An optical sight having a coaxial illumination function comprising:
    an outer barrel unit extending about an axis and having a front end and a rear end;
    an objective lens unit mounted to said front end of said outer barrel unit and having a first optical axis;
    an ocular lens unit mounted to said rear end of said outer barrel unit;
    a magnification unit disposed in and on said outer barrel unit between said objective lens unit and said ocular lens unit, said magnification unit having a second optical axis;
    an illumination unit disposed on said magnification unit and which includes a light source spaced apart from said second optical axis, and a reflective element for projecting emitted light, which is emitted from said light source, onto said objective lens unit;
    wherein said light source and said reflective element are disposed and configured such that the emitted light is projected onto said objective lens unit substantially along the second optical axis, the emitted light being formed into parallel light after passing through said objective lens unit, the parallel light being substantially parallel with the first optical axis and being projected onto a target.

2. The optical sight as claimed in claim 1, wherein:
    said magnification unit includes a first inner barrel component rotatably disposed in said outer barrel unit, said first inner barrel component having a front end portion and a rear end portion;
    said light source being disposed on an outer peripheral surface of said front end portion in a manner such that said light source is parallel to the second optical axis;
    said reflective element being disposed on a front end of said front end portion; and
    said reflective element has a first reflection surface intersecting the second optical axis of said magnification unit, and a second reflection surface parallel to said first reflection surface and facing said light source, the emitted light from said light source being reflected toward said first reflection surface by said second reflection surface and then being reflected toward said objective lens unit by said first reflection surface.

3. The optical sight as claimed in claim 2, wherein said reflective element includes a first prism and a second prism, said first prism having a first plane facing said objective lens unit, a second plane facing said ocular lens unit, and a first inclined surface interconnecting said first plane and said second plane, said second prism having a third plane facing said objective lens unit, a fourth plane facing said ocular lens unit, a second inclined surface interconnecting said third plane and said fourth plane and joined with said first inclined surface, and a third inclined surface interconnecting said third plane and said fourth plane and parallel to said second inclined surface, said first reflection surface being formed where said first and second inclined surfaces are joined, said second reflection surface being formed on said third inclined surface.

4. The optical sight as claimed in claim 3, wherein said illumination unit includes a focusing lens that is disposed on said outer peripheral surface of said front end portion of said first inner barrel component between said reflective element and said light source.

5. The optical sight as claimed in claim 4, wherein said objective lens unit and said reflective element cooperate to define a focal length that is substantially identical to a length of an optical path of the emitted light from said light source to said objective lens unit.

6. The optical sight as claimed in claim 2, wherein said outer barrel unit has a circumferentially extending slot that at least partially surrounds the axis, said magnification unit including a second inner barrel component sleeved on said first inner barrel component, a plurality of lens assemblies movably disposed in said first inner barrel component along the axis, a magnification adjusting ring sleeved on said outer barrel unit, and an adjusting pin disposed on said magnification adjusting ring, said adjusting pin extending through said circumferentially extending slot to connect to said second inner barrel component.

7. The optical sight as claimed in claim 6, wherein said first inner barrel component has a guide slot, said second inner barrel component having a plurality of cam slots that respectively correspond to said lens assemblies, each of said lens assemblies having a guide pin that extends through said guide slot and into the respective one of said cam slots.

8. The optical sight as claimed in claim 2, further comprising at least one adjustment unit disposed on said outer barrel unit, said adjustment unit including an adjusting component that extends into said outer barrel unit and abuts against said first inner barrel component.

9. The optical sight as claimed in claim 1, further comprising a battery that is disposed in said outer barrel unit and is electrically connected to said light source.

10. The optical sight as claimed in claim 1, further comprising an operating button disposed on said outer barrel unit to control a switching operation of said light source.

11. The optical sight as claimed in claim 1, wherein said light source includes a light emitting diode (LED).

\* \* \* \* \*